T. GARRICK.
HARVESTER CUTTER.

No. 112,582.   Patented Mar. 14, 1871.

Witnesses.
William W. Rickard
Alfred Rickard

Inventor.
Thomas Garrick

United States Patent Office.

THOMAS GARRICK, OF PROVIDENCE, RHODE ISLAND.

Letters Patent No. 112,582, dated March 14, 1871.

IMPROVEMENT IN HARVESTER-CUTTERS.

The Schedule referred to in these Letters Patent and making part of the same.

*To all whom it may concern:*

Be it known that I, THOMAS GARRICK, of Providence, in the county of Providence and State of Rhode Island, have invented an Improved Knife or Knives for the Fingers of Mowing-Machines; and do hereby declare that the following is a full and exact description, reference being had to the accompanying drawing making a part of this specification.

The nature of my invention consists in a movable, elastic, self-adjusting knife or knives, placed diagonally or otherwise within the slot of the finger or fingers of mowing-machines, in such a manner as to bring its edge or edges, or portions of its edge or edges, in more perfect contact with the edge or edges of the knives attached to the cutting bars of mowing-machines, for the purpose of producing a shearing cut by the lateral motion of said cutting-bars, and at the same time rendering all the knives mutually self-sharpening.

To enable those skilled in the art to make and use my invention, I will proceed to describe its construction and operation.

Figure 1:
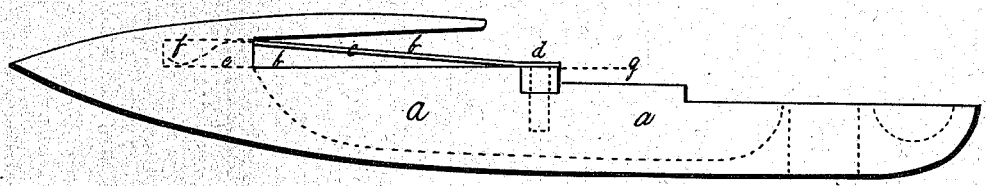

Figure 1 represents a side view of the finger of a mowing-machine.

Figure 2:
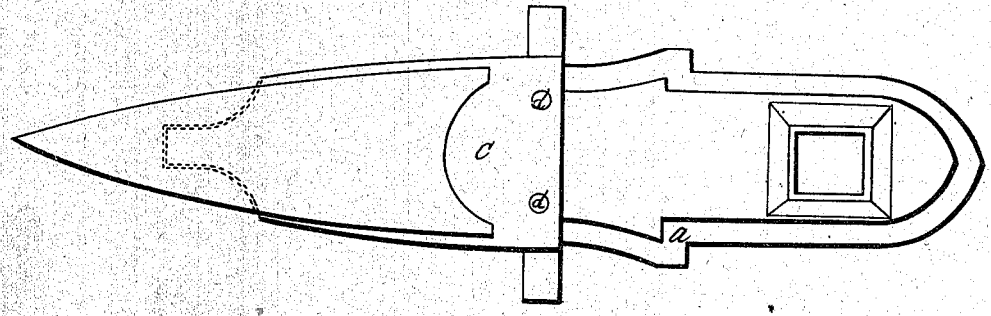

Figure 2, a top view of the same.

*a*, the iron finger.

*b*, the slot in said finger.

*c*, the diagonally-placed elastic knife, fastened by rivets or other device to the finger at *d*.

*e*, point or end of said knife, resting in slot and upon finger at *f*.

The finger is made in the usual form, of cast metal; but the knife C, within the said finger, is a spring, fixed at one end by being riveted near the base of the finger, with its free end extending forward beneath the finger-guard.

This knife C also curves slightly upward from its fixed end, and across the plane of the edge of the sliding cutter on the cutter-bar, so that when the cutter's edge slides across the spring-edge of the knife in the finger a perfect shearing cut of the interposing grain is produced, the free end of the spring-knife yielding to the passage of the cutter over it, and the two edges being drawn against each other in a manner to produce a self-sharpening effect upon both.

Having described my said invention,

I claim—

The spring-knife C, constructed as described, in combination with a harvester-finger, as and for the purpose specified.

THOMAS GARRICK.

Witnesses:
WILLIAM W. RICKARD,
ALFRED RICKARD.